United States Patent
Rutherford

(10) Patent No.: US 11,102,956 B1
(45) Date of Patent: Aug. 31, 2021

(54) GRASPABLE PET TOY

(71) Applicant: Ryan Rutherford, Lambertville, NJ (US)

(72) Inventor: Ryan Rutherford, Lambertville, NJ (US)

(73) Assignee: Cosmic Pet LLC

( * ) Notice: Subject to any disclaimer, the term of this patent is extended or adjusted under 35 U.S.C. 154(b) by 0 days.

(21) Appl. No.: 17/155,526

(22) Filed: Jan. 22, 2021

Related U.S. Application Data

(60) Provisional application No. 62/982,454, filed on Feb. 27, 2020.

(51) Int. Cl.
 *A01K 29/00* (2006.01)
 *A01K 15/02* (2006.01)

(52) U.S. Cl.
 CPC .................. *A01K 15/026* (2013.01)

(58) Field of Classification Search
 CPC .... A01K 15/026; A01K 15/025; A01K 15/02; A63B 41/02; A63B 41/10; A63B 43/007
 See application file for complete search history.

(56) References Cited

U.S. PATENT DOCUMENTS

| | | | | |
|---|---|---|---|---|
| 4,321,888 A * | 3/1982 | Topliffe | ............... | A01K 15/025 119/709 |
| 5,230,682 A * | 7/1993 | Myers | ................ | A63B 21/0004 473/576 |
| 5,551,687 A * | 9/1996 | Krull | .................... | A63B 43/007 473/573 |
| 5,961,406 A * | 10/1999 | Hass | ..................... | A01K 15/025 119/707 |
| D455,182 S * | 4/2002 | Chu | .............................. | D21/398 |
| D500,901 S * | 1/2005 | Crane | .......................... | D30/160 |
| D500,902 S * | 1/2005 | Crane | .......................... | D30/160 |
| D583,421 S * | 12/2008 | Slinker | ........................ | D21/398 |
| D625,474 S * | 10/2010 | Byrne | .......................... | D30/160 |
| 8,881,685 B2 * | 11/2014 | Miavitz | ................ | A01K 15/026 119/707 |
| D747,834 S | 1/2016 | Byrne | | |
| D778,002 S | 1/2017 | Byrne | | |
| 2004/0200433 A1 * | 10/2004 | Oblack | ................ | A01K 15/026 119/707 |
| 2005/0028754 A1 | 2/2005 | Levan | | |
| 2005/0178343 A1 | 8/2005 | Lubeck | | |
| 2010/0326368 A1 * | 12/2010 | Tsengas | ............... | A01K 15/025 119/707 |
| 2018/0161636 A1 * | 6/2018 | Ahmed | .................. | A63B 41/08 |

* cited by examiner

*Primary Examiner* — Trinh T Nguyen
(74) *Attorney, Agent, or Firm* — Gugliotta & Gugliotta LPA

(57) ABSTRACT

A pet toy is provided having a plurality of graspable protuberances, each formed as an elongated substantially flat surface portion shaped as a rectangle or as a loop. Each protuberance is affixed at a first end to the ball element. Each protuberance adapted further forms an elongated substantially flat surface portion that is gripped in an animal's mouth such that when the spherical portion is gripped in an animal's mouth.

20 Claims, 1 Drawing Sheet

GRASPABLE PET TOY

RELATED APPLICATIONS

There present application claims benefit of U.S. Provisional Ser. No. 62/982,454, filed on Feb. 27, 2020 and incorporated by reference as if fully rewritten herein.

BACKGROUND OF THE INVENTION

1. Field of the Invention

The present invention relates generally to pet toys and, more particularly, to a pet toy ball having graspable protuberances extending therefrom.

2. Description of the Related Art

The use of toy balls as pet play devices has been significantly limited to relatively small balls which can be grasped in the mouth of the dog, cat or other pet. This limitation of pet balls to a relatively small size has also limited the ability of pets to visually perceive the balls. Small balls furthermore are easily lost, are more difficult to find, and are generally less durable due to engagement between the ball surface and the animal's teeth.

Some methods and devices are known that incorporate various mechanisms extending from a ball to provide a grasping structure. For example:

Various chew or retrieval toys are known that incorporate a 'rope' type element as a grasping extension from a ball element. These include, inter alia: U.S. D778,002 for a Rope Ball Pet Toy with Pull; U.S. D747834 for a Braided Rope and Ball Pet Toy; and U.S. 2005/0178343 for a Dog Tug Toy and Method of Manufacture.

Further, U.S. Patent Publication 2005/0028754, published in the name of Levan, teaches a novelty dog toy including an elongated substantially flat surface portion extending from a substantially spherical portion. The substantially spherical portion is modeled after a dog fetch ball and rests comfortably in a dog's mouth. The elongated portion is shaped, textured, and colored to resemble an oversized human or animal tongue, such that it provides a novel and comical appearance to a pet when the pet holds the spherical portion in his mouth.

It is preferable that otherwise conventional ball constructions of any given size be adapted to allow for interaction with a pet. Consequently, a need has been felt for providing a pet toy ball having graspable protuberances extending therefrom.

SUMMARY OF THE INVENTION

It is thus an object of the present invention to provide an improved pet toy ball having graspable protuberances extending therefrom.

It is a feature of the present invention to provide graspable protuberances integrated with and extending from a ball surface.

The present invention provides a pet toy having a plurality of graspable protuberances, each formed as an elongated substantially flat surface portion shaped as a rectangle or as a loop. Each protuberance is affixed at a first end to the ball element. Each protuberance adapted further forms an elongated substantially flat surface portion that is gripped in an animal's mouth such that when the spherical portion is gripped in an animal's mouth. The ball element may be formed of a cover having of number of interlocking panels, with adjacent panels stitched, glued or molded together. A lining may be provided within an inner surface of the cover, and a bladder retained within an inner volume of the ball element.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
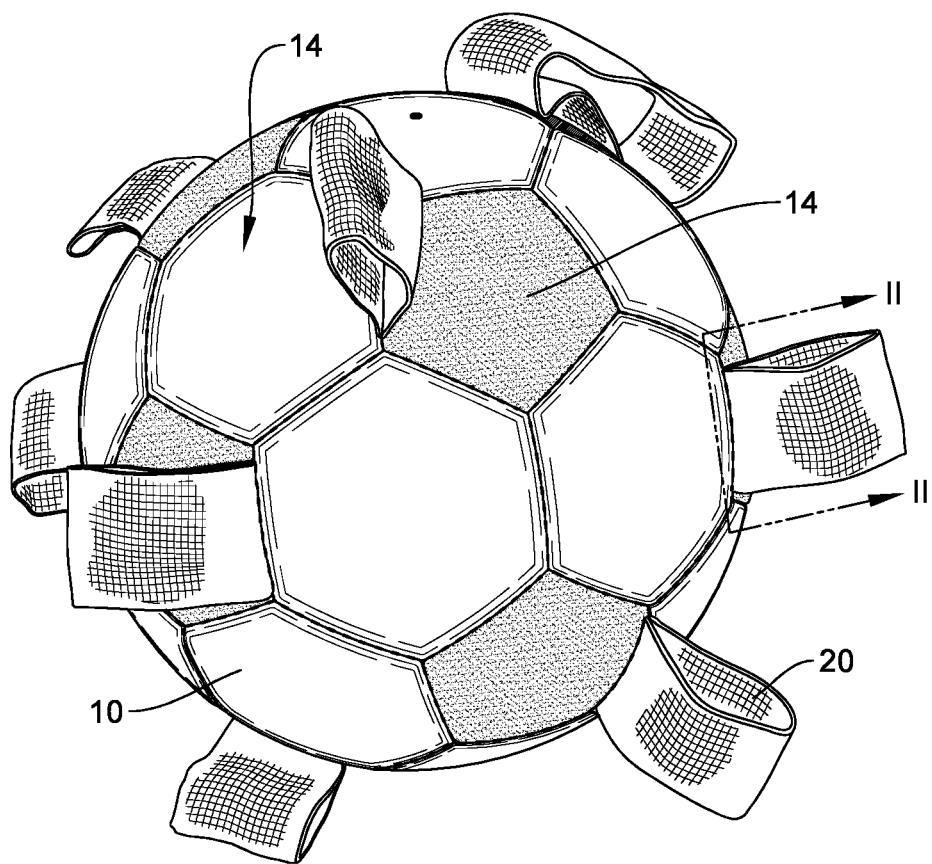
FIG. 1 depicts an improved pet toy ball according to the preferred embodiment of the present invention.
Figure 2:
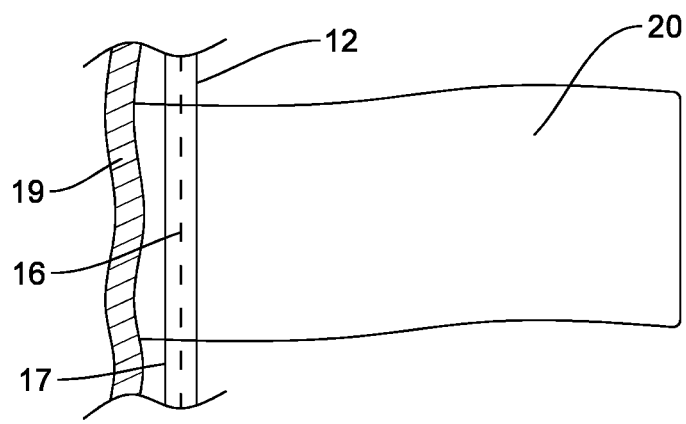
FIG. 2 is a cross sectional view taken along line II-II thereof.
Figure 3:
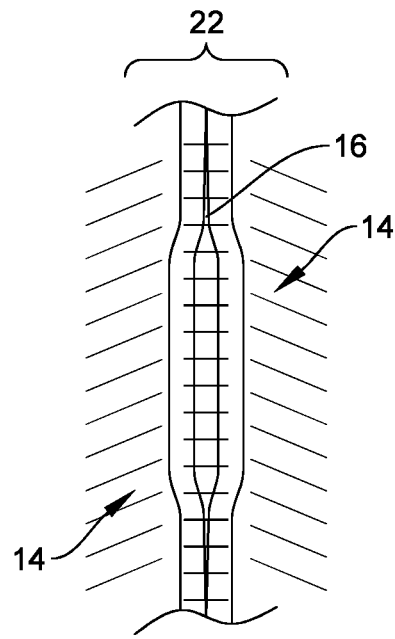
FIG. 3 is a detail cross sectional view taken about an attachment seam 22.

The best mode for carrying out the invention is presented in terms of its preferred embodiment, herein depicted within the Figures. It should be understood that the legal scope of the description is defined by the words of the claims set forth at the end of this patent and that the detailed description is directed around an improvement in which an otherwise conventional soccer ball construction is modified with the present invention, and is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals indicate the same parts throughout the several views, a ball element, generally noted as 10, is provided having a soccer ball type configuration incorporating a number of flexible protuberance 20. Is should be apparent to those have ordinary skill in the relevant art, in light of the present teachings, that the "ball element" 10 may be configured as a different type of ball or other type of three dimensional shape and, as such, the configuration shown should not be considered limiting but rather broadly interpreted to include any similar or functionally equivalent designs.

The ball element 10 may be formed in a variety of ways, and as an example may include a cover 12 formed of number of interlocking panels 14, stitching 16 for connecting adjacent panels 14, a lining 17, and the bladder 19.

The cover 12 may be made from leather, polyurethane, poly vinyl chloride (PVC), or a combination thereof. Further, the cover 12 may be made with a felt material similar to what is used on a tennis ball. While shown herein having stitched covers, those having ordinary skill in the relevant art would understand that rubber or molded covers may also be utilized.

The panels 14 may be provided in a plurality of different segments that make up the outside cover 12 of the ball 10. As would also be understood by those having ordinary skill in the relevant art, a variety of designs for each panel and a variety in the number of interlocking panels 14 are known. By way of example, a 32-panel ball is the most common and is the type used in the construction of most otherwise conventional soccer balls. Such a ball structure consists essentially 20 hexagonal (six sided) and 12 pentagonal (five sided) surfaces. Such a configuration is known as a truncated icosahedron and creates a more spherical outer surface due to panels bulges resulting from pressure of the air inside. Still further, other traditional designs are known, including 18 and 26-panel constructions.

According to one aspect of the present invention, the panels 14 may be affixed together at their adjacent peripheries by stitching 16. Such stitching 16 may be formed of a polyester or similar thread, with a 5-ply twisted polyester cord being conventionally used in as a material of choice in stitching together many soccer balls. It should be understood by those having ordinary skill in the relevant art, in light of the present teachings, that alternate or equivalent panel attachment may be used such as by gluing or by thermally molded together:

The lining 17 may be of a single or multiple layers placed between the cover 12 and the bladder 19. The lining layers may be composed of polyester and/or cotton bonded (laminated) together in order to provide strength, structure and bounce. Additionally, a foam layer may be added for improved cushioning.

The bladder 19 is provided to be inflated and hold pressurized air. The bladder 19 may be made from latex or butyl or other similar or functionally equivalent material. In addition to or as an alternate to an inflated bladder, the bladder 19 may be further filled with foam (not shown) so as to limit the bouncing capability of the ball 10.

As a key element of the present invention, a number of flexible protuberance 20 are incorporated within at least a portion of a seam 22 formed between adjacent panels 14. The protuberances 20 may be formed of a fabric material or other similar or functional equivalent material that may be bitten, chewed or otherwise grasped by a pet dog, cat or similar animal within its mouth and by its teeth. The protuberances 20 may each be formed as a rectangular or elongated flag affixed at one end within the seam 22. The protuberances 20 may also be formed as a single fold loop of material wherein apposed edges are pulled together with the loose ends affixed within the seam, thereby creating an open loop that extends from the surface of the ball. It is envisioned that the attachment of the fixed end of the protuberance will be impinged between attached, adjacent panels with either stitching or gluing to affix the attachment portion to the ball.

2. Manufacture of an Exemplary Embodiment

In forming the ball element 10, the first stage is to roll out the material to be used for the outing cover 12 of the ball. The cover 12 may be made from several layers of synthetic foam-filled leaves (panels 14), which are glued (laminated) together to produce a tough, smooth exterior. The leaves 14 are cut into the exact amount needed to make one ball. Then the panels are preprinted with any brand names and graphics before being cut. All logos would be printed at this point in the process. Printing is typically accomplished by silk-screening onto the cover material. After printing, the material may have another layer of clear urethane (or another proprietary material) applied over the printing for protection.

The number of individual panels 14 required are then cut out, and holes are pre-punched in preparation for stitching. The stitching is performed by turning the ball inside out, so none of the stitches show on the outside. A different type of needle is used to complete the stitching of each panel, which effectively makes the final knot 'disappear'. During the stitching process the protuberances 20 are placed between adjacent panels 14 so as to permanently attached the protuberances extending from the ball surface when complete. The stitched ball is then reversed, with the bladder inserted and inflated.

3. Operation of the Preferred Embodiment

In operation, the ball 10 may be utilized as one would any otherwise conventional ball. However, the pet dog or cat can grasp or carry the ball by any one of a plurality of protuberances, which may be otherwise chewed by the animal. Such a structure allows for interaction a play with the ball by the animal even in the event that the outer circumference of the ball itself is too large to fit within the animal's mouth.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as is suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

What is claimed is:

1. A pet toy comprising:
   an inflatable ball element formed of a cover having of number of interlocking panels;
   stitching for connecting adjacent panels;
   a lining within an inner surface of the cover; and
   a bladder retained within an inner volume of the ball element; and
   a plurality of flexible protuberances pendant from the outer cover and affixed between the connecting adjacent panels.

2. The pet toy of claim 1, wherein the cover is made from leather, polyurethane, poly vinyl chloride (PVC), or a combination thereof.

3. The pet toy of claim 1, wherein said number of interlocking panels consists essentially of 20 hexagonal (six sided) and 12 pentagonal (five sided) surfaces.

4. The pet toy of claim 1, wherein said number of interlocking panels consists essentially of 18 surfaces.

5. The pet toy of claim 1, wherein said number of interlocking panels consists essentially of 26 surfaces.

6. The pet toy of claim 1, wherein each of the plurality of flexible protuberance are individually incorporated within at least a portion of a seam formed between adjacent panels.

7. The pet toy of claim 6, wherein each protuberances is formed of a fabric material.

8. The pet toy of claim 6, wherein each protuberance is formed as a rectangular or elongated flag affixed at one end within the seam.

9. The pet toy of claim 7, wherein each protuberance is formed as a rectangular or elongated flag affixed at one end within the seam.

10. The pet toy of claim 8, wherein each protuberance is formed as a single fold loop of material wherein apposed edges are pulled together with the loose ends affixed within the seam, thereby creating an open loop that extends from the surface of the ball.

11. The pet toy of claim 9, wherein each protuberance is formed as a single fold loop of material wherein apposed edges are pulled together with the loose ends affixed within the seam, thereby creating an open loop that extends from the surface of the ball.

12. The pet toy of claim 1, wherein the plurality of flexible protuberance each:
   are incorporated within at least a portion of a seam formed between adjacent panels; and
   is formed as a rectangular or elongated flag affixed at one end within the seam, wherein each protuberance is formed as a single fold loop of material wherein apposed edges are pulled together with the loose ends affixed within the seam, thereby creating an open loop that extends from the surface of the ball.

13. A method of interacting with a pet comprising:
   selecting a pet toy of claim 12; and
   manipulating the pet toy interactively between a pet and a user such that the pet grasps the rectangular or elongated flag in furtherance of said manipulating.

14. A pet toy comprising:
   an inflatable ball element formed of a cover having of number of interlocking panels wherein the panels are affixed together at their adjacent peripheries by thermally molding;
   a lining within an inner surface of the cover; and
   a bladder retained within an inner volume of the ball element; and
   a plurality of flexible protuberances pendant from the outer cover and affixed between the connecting adjacent panels.

15. The pet toy of claim 14, wherein the cover is made from leather, polyurethane, poly vinyl chloride (PVC), or a combination thereof.

16. The pet toy of claim 14, wherein said number of interlocking panels consists essentially of 20 hexagonal (six sided) and 12 pentagonal (five sided) surfaces.

17. The pet toy of claim 14, wherein said number of interlocking panels consists essentially of 18 surfaces.

18. The pet toy of claim 14, wherein said number of interlocking panels consists essentially of 26 surfaces.

19. The pet toy of claim 14, wherein each protuberance is formed as a single fold loop of material wherein apposed edges are pulled together with the loose ends affixed within the seam, thereby creating an open loop that extends from the surface of the ball.

20. The pet toy of claim 14, wherein the plurality of flexible protuberance each:
   are incorporated within at least a portion of a seam formed between adjacent panels; and
   is formed as a rectangular or elongated flag affixed at one end within the seam, wherein each protuberance is formed as a single fold loop of material wherein apposed edges are pulled together with the loose ends affixed within the seam, thereby creating an open loop that extends from the surface of the ball.

* * * * *